Patented Apr. 19, 1949

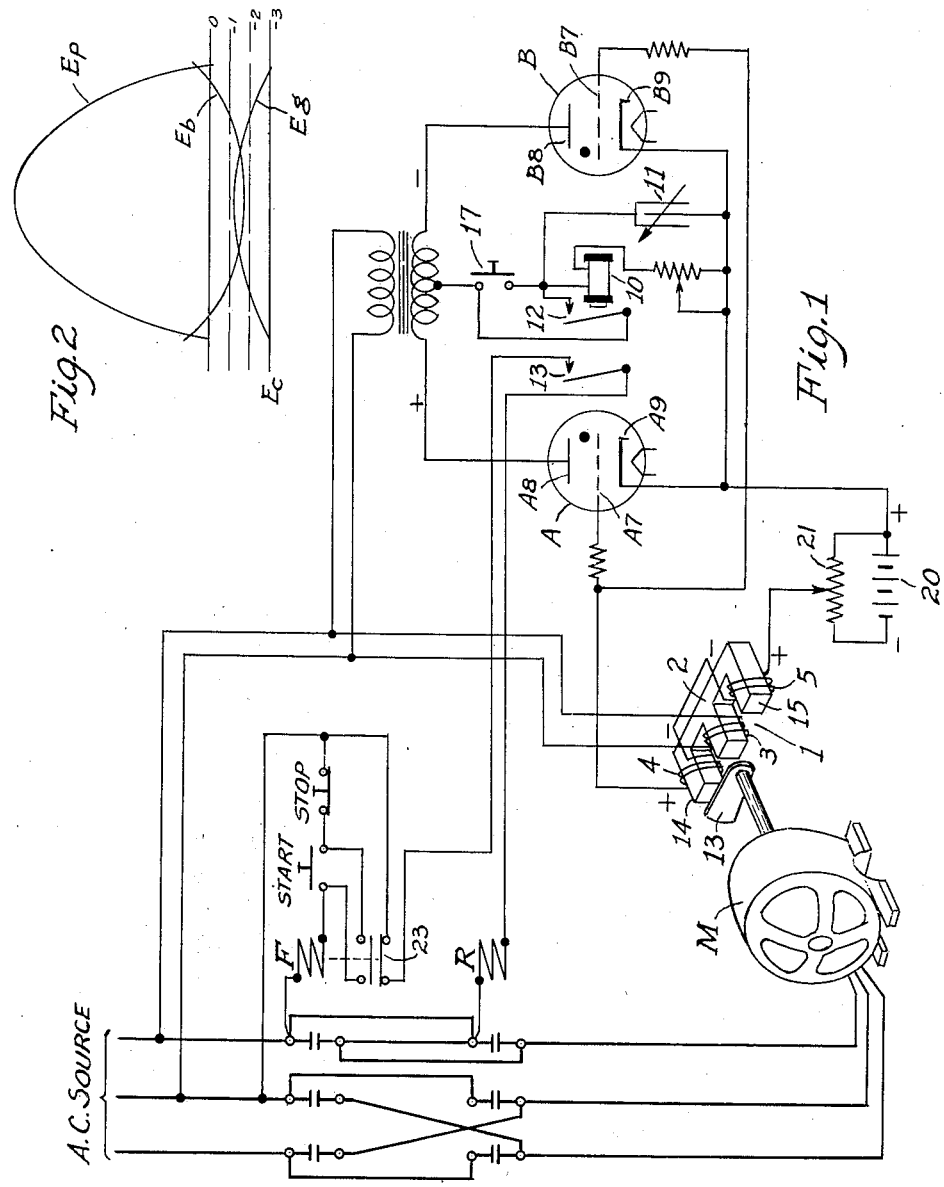

2,467,582

UNITED STATES PATENT OFFICE 2,467,582

SPEED RESPONSIVE MOTOR CONTROL SYSTEM

Austin G. Corkran, Philadelphia, Pa.

Application January 25, 1946, Serial No. 643,361

3 Claims. (Cl. 318—210)

My invention relates to an electrical control system, responsive to rotary speed, which will provide control of an electric motor when the operating speed of the motor falls below a predetermined number of revolutions per minute.

Such a system is, for example, useful in removing power from an A. C. induction motor after it has been brought rapidly to a stop by plugging control. A further application would provide an alarm, or shut down a motor driving a conveyor belt or other mechanism when the motor speed is reduced to a predetermined number of revolutions per minute.

Devices for this purpose, known generally as zero speed or plugging switches are widely used in industrial control applications. These devices are usually mechanically operated by a slip clutch or friction drive and have contained operating limitations, which, in some instances, have provided unsatisfactory results or have restricted their application. Among these limitations are; inability to function at low normal speeds, unstable point of operation, difficulty in making adjustment for different speeds, wear of clutch or friction drive, the necessity of reversal of rotation for their operation, and the requirement of lockout devices to provide adequate safety of operation.

It is an object of the present invention to provide an electrical control system, responsive to rotary speed, which is readily adjustable for response to speeds as low as 15 revolutions per minute and which may be used on speeds up to 1800 revolutions per minute without gearing or speed reducers, which has no frictional driving parts, and which has a stable operating point for any speed setting. It is a further object to provide a control system which does not require a reversal of rotation for its operation and which contains a safety feature which renders the system inoperative until a "ready" switch is closed. This prevents accidental starts if the motor is turned over by hand in making a machine set up.

The foregoing objects and advantages of my invention will be further understood from the following description of the invention, illustrated in the accompanying drawing, in which—

Fig. 1 shows in diagrammatic form a motor plugging control embodying the present invention.

Fig. 2 is a diagram of characteristic voltage curves of a thyratron tube.

Referring to Fig. 1, numeral 1 represents the stationary member of a transformer device, comprising an E-shaped iron core 2, constructed to give a balanced flux path between the center leg and each of the two outer legs, a primary winding 3 wound about the center leg and connected to an A. C. source, to provide excitation for said flux paths, and two secondary windings 4 and 5 wound about outer legs 14 and 15 respectively, said windings having an equal number of turns and connected in a series, phase opposing sense, so that their induced voltages are equal and opposite when the flux paths of legs 14 and 15 are balanced. An armature 13 of magnetic material, rotatably attached to the shaft of motor M, is adapted to magnetic relation with core 2 in such manner that as said armature is rotated the magnetic flux paths of legs 14 and 15 are alternately unbalanced, thereby producing periodic unbalanced voltages in windings 4 and 5 and resulting in an alternating voltage at the output terminals of said windings, said output voltage occurring twice for each revolution of motor M and containing a number of cycles in dependence upon the speed of said motor. Numeral 20 indicates a permanent negative bias means, so adjusted by potentiometer 21 that grids A7 and B7 are held at a negative voltage $Ec$, Fig. 2, below the critical break down voltage $Eb$ of the thyratron tubes. The output voltage $Eg$ from the transformer device is applied to the grid circuits A7 and B7 in series with the permanent negative bias voltage $Ec$ from source 20 and is of such amplitude as to reduce the negative grid potential below the critical break down voltage of the tube and of a phase sense as to cause either tube A or tube B to conduct when said voltage is applied. Indicated instantaneous polarities of the transformer device are for an A. C. half cycle in which the potential $Ep$ applied to anode A8 is positive with respect to cathode A9. When armature 13 is in magnetic relation with flux path associated with winding 4 tube A conducts. Anode B8 being negative prevents tube B from conducting. During the A. C. half cycle in which anode B8 is positive the indicated instantaneous polarities of windings 4 and 5 are reversed, so that when armature 13 is in magnetic relation with flux path associated with winding 5 tube B will conduct. Anode A8 being negative prevents tube A from conducting. It is therefore apparent that there will be two periods in each revolution of motor M during which relay 10 and condenser 11 are energized.

In operation, motor M is started in a forward direction by closure of contactor F from the "start" push button. As the motor rotates, armature 13, rotating at an equal speed, causes an A. C. voltage periodically at the output terminals of transformer device 1. Said voltage is applied to grid circuits A7 and B7 as previously described. When "set up" push button 17 is operated the anode-cathode circuits of tubes A and B are completed so that ionization of one of said tubes is produced for each period of output voltage from device 1 applied to grid circuits A7 and B7, the phase sense of said voltage determining whether tube A or tube B will conduct. Relay 10 and condenser 11 are thereby energized and so maintained through an interlock contact 12 on relay 10 after button 17 is released. Relay 10 and condenser 11 forming a resistor-capacitor combination have a definite time constant whereby said relay is held in an actuated position for a definite time interval after interruption of their source of energization, said source being the current pulses supplied by tubes A and B. Therefore, as long as said interruptions, or periods non conductive are of shorter duration than the drop out time interval of relay 10, said relay will be maintained in the actuated position, and its contacts 12 and 13 will remain closed. This condition will be satisfied for all speeds above that for which the system is adjusted to operate.

If now the "stop" push button is operated, contactor F is deenergized and opens the power connection to motor M. At the same time a normally closed contact 23 on contactor F closes, said contact being in series with the now closed contact 13 of relay 10, thereby energizing the coil of contactor R. Said contactor immediately closes, applying reverse power to motor M, resulting in a rapid deceleration of said motor. When the speed of motor M is reduced to a predetermined low rate which results in the interval between current pulses supplied to relay 10 and condenser 11 being of longer duration that the drop out time of relay 10, said relay will open its contact 13, thereby deenergizing the coil of contactor R which opens and disconnects motor M from its power source before a reversal of rotation of said motor occurs. Contact 12 is also opened when relay 10 drops out, thereby making the plugging sequence inoperative until "set up" button 17 is again operated, at the same time allowing starting and stopping without plugging of motor M through contactor F.

While I have shown and described the preferred embodiment of my invention, it will be understood that I am not to be limited thereto, as various arrangements and changes could be made therein without departing from the scope of the invention.

I claim:

1. In combination, an alternating current motor; a current supply therefor; a transformer having a primary winding connected to said current supply and two secondary windings connected in a series, phase opposed sense; means for periodically varying the magnetic coupling between said primary and secondary windings in accordance with the motor speed; an electron discharge tube having a grid; a circuit for impressing the periodic output potential of the transformer upon said grid to render said tube conducting; a relay responsive to the current conducted by said tube for controlling a circuit of the motor; and means to delay the dropout of said relay.

2. In combination, an alternating current motor, a current supply therefor; means for reversing said supply for plugging the motor; an electromagnetic switch in circuit with said supply; an electron discharge tube having a grid; transformer means to impress upon said grid a periodic potential, the frequency of which varies with the motor speed, to render said tube conducting; a relay actuated by the current conducted by said tube when the speed of said motor is high, and released to thereby disconnect the motor from its current supply when, upon plugging, the speed is reduced substantially to zero.

3. In combination, a shaft adapted to be rotated at different speeds; an alternating current supply; a transformer having two balanced, open gap flux paths, primary means, connected to said current supply, for exciting the flux paths, and two secondary windings connected in a series phase opposed sense; means for varying the magnetic reluctance of said flux paths whereby to provide a periodic potential, the frequency of which varies in accordance with the speed of said shaft; a gaseous discharge tube having an anode, a cathode and a control grid; a circuit, including the secondary windings of said transformer, for impressing said periodic potential upon the control grid to render said tube conductive; a relay connected in the anode circuit of said tube and actuated by the current conducted thereby; means for preventing said current from actuating the relay prior to operation of said means; and means for providing a time delay in dropout of said relay.

AUSTIN G. CORKRAN.

REFERENCES CITED

The following references are of record in the file of this patent:

UNITED STATES PATENTS

| Number | Name | Date |
|---|---|---|
| 1,611,223 | Nyquist | Dec. 21, 1926 |
| 1,706,443 | Dekle | Mar. 26, 1929 |
| 1,834,267 | Bonn | Dec. 1, 1931 |
| 1,936,620 | Crout et al. | Nov. 28, 1933 |
| 2,210,412 | Jones et al. | Aug. 6, 1940 |
| 2,351,760 | Beers | June 20, 1944 |